April 12, 1938. E. H. J. C. GILLETT 2,113,884
MOTOR VEHICLE TRANSMISSION AND CONTROL SYSTEM
Filed Dec. 21, 1933 7 Sheets-Sheet 1

Inventor
Edward H. J. C. Gillett
by Wilkinson & Mawhinney
Attorneys.

April 12, 1938.    E. H. J. C. GILLETT    2,113,884
MOTOR VEHICLE TRANSMISSION AND CONTROL SYSTEM
Filed Dec. 21, 1933    7 Sheets-Sheet 3

Inventor
Edward H.J.C. Gillett
by Wilkinson & Mawhinney
Attorneys

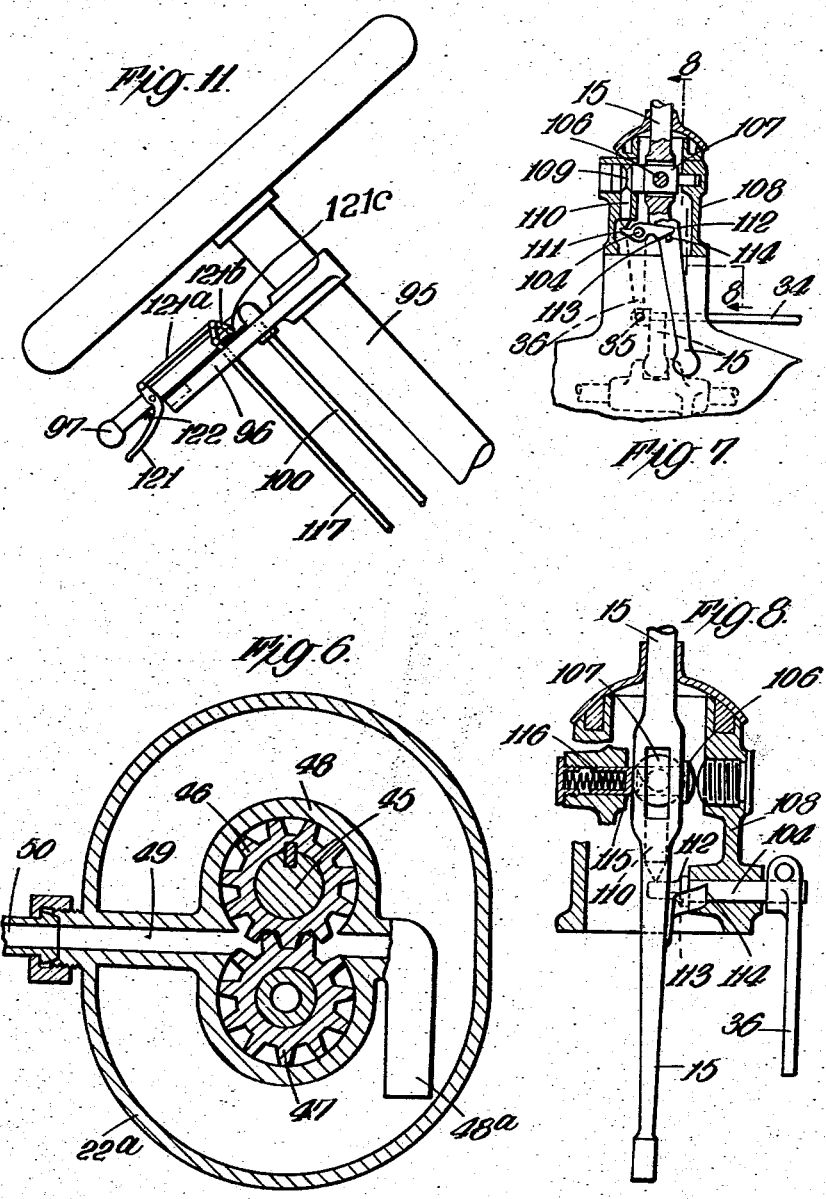

April 12, 1938.  E. H. J. C. GILLETT  2,113,884
MOTOR VEHICLE TRANSMISSION AND CONTROL SYSTEM
Filed Dec. 21, 1933  7 Sheets-Sheet 5
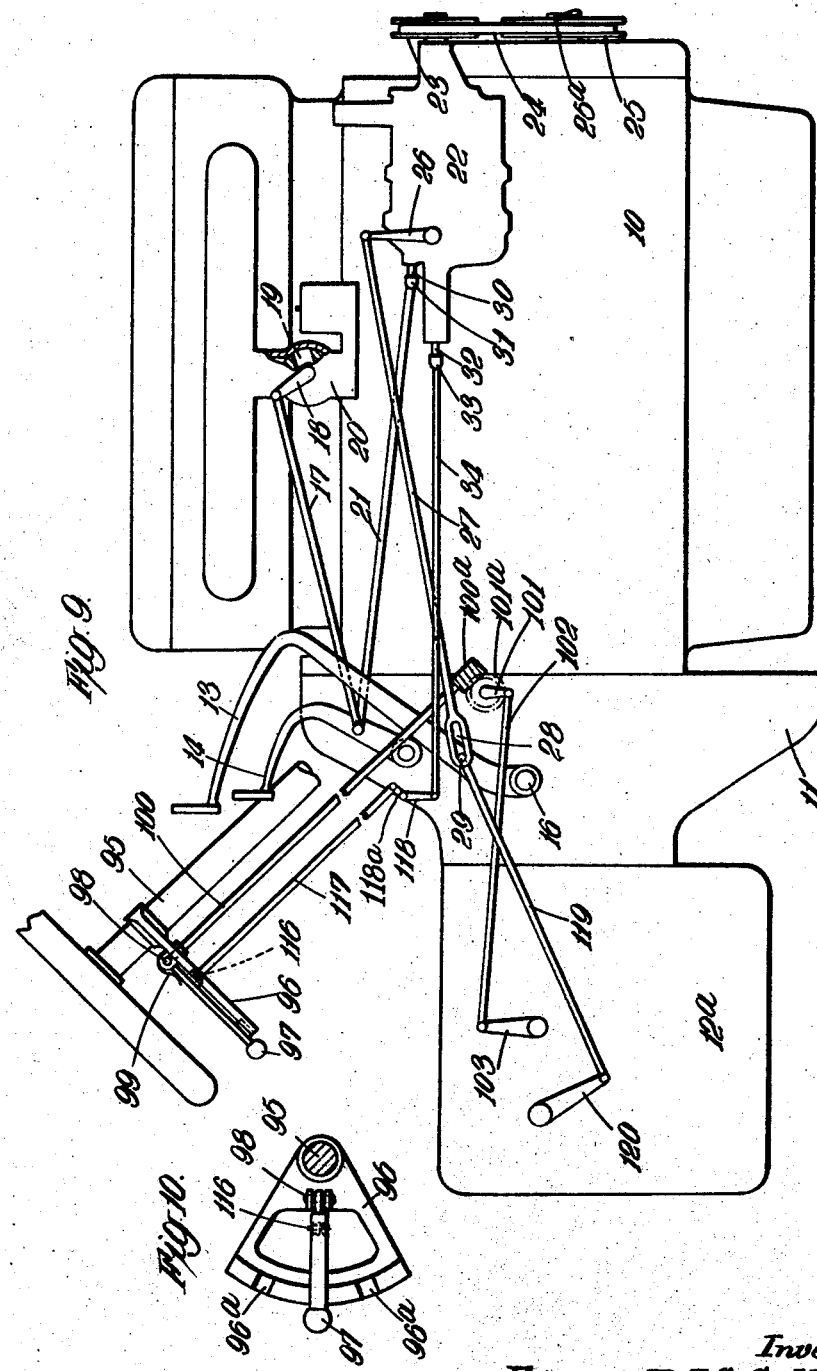
Inventor
Edward H.J.C. Gillett
by Wilkinson & Mawhinney
Attorneys.

April 12, 1938.  E. H. J. C. GILLETT  2,113,884
MOTOR VEHICLE TRANSMISSION AND CONTROL SYSTEM
Filed Dec. 21, 1933  7 Sheets-Sheet 6
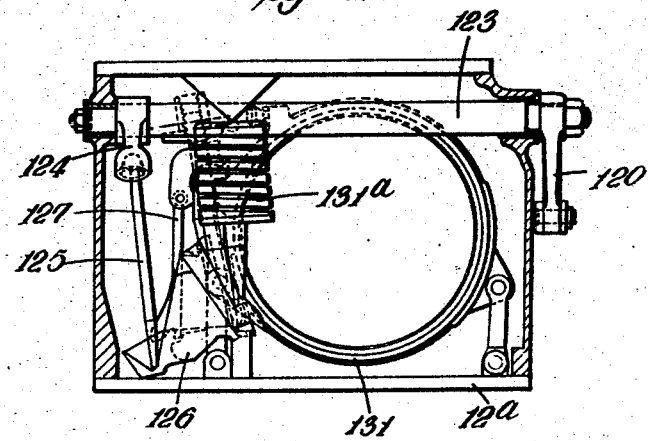
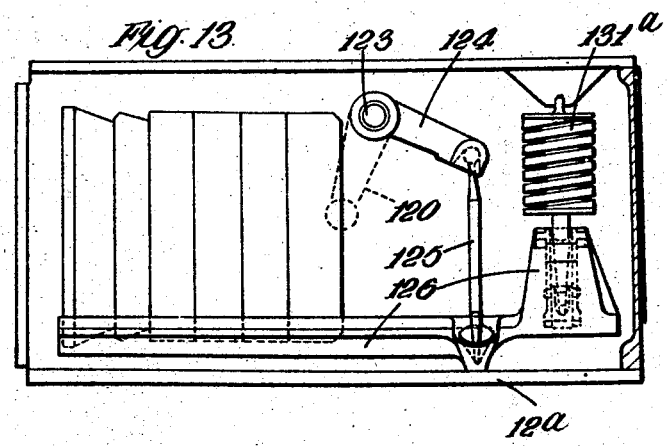
Inventor
Edward H.J.C. Gillett
by Wilkinson & Mawhinney
Attorneys.

Patented Apr. 12, 1938

2,113,884

UNITED STATES PATENT OFFICE 2,113,884

MOTOR VEHICLE TRANSMISSION AND CONTROL SYSTEM

Edward Henry James Cecil Gillett, West Hampstead, London, England

Application December 21, 1933, Serial No. 703,473
In Great Britain January 19, 1933

19 Claims. (Cl. 192—.01)

The present invention relates to improvements in transmission and control systems for motor vehicles and refers especially to an improved auxiliary power device for operating motor vehicle controls and more particularly transmission clutches in such vehicles together with means of controlling said improved power device. The invention also refers to the combination in a motor vehicle of an auxiliary power device as above referred to with variable speed gears of the epicyclic type.

Among the objects of the invention are included the following:—

(a) The provision of an auxiliary power device adapted to produce progressive operation of the control to which it is applied and in particular a power device for operating a clutch or equivalent transmission clutch, having control means responsive to the speed of the motor and adapted to engage and disengage the clutch over a selected range of motor speed and capable of permitting the clutch to be slipped indefinitely, a provision of this sort being of great utility in manoeuvring the vehicle in confined spaces or in traffic.

(b) The provision of means for safeguarding the clutch against burning out by slipping under excessive load, this object being attained by providing a throttle-connected control for the power device which ensures the engagement of the clutch or coupling when the throttle exceeds a selected opening independently of the motor-speed responsive control.

(c) The provision of an independent control for the power device enabling the clutch or other vehicle control to be operated by the power device at motor speeds exceeding the operative speed range of the speed responsive control. This independent control is preferably carried out in conjunction with the operation of the gear-shifting means of the variable speed gear of the vehicle.

(d) The provision in combination with an epicyclic variable speed gear having a manual selector control and an executive control for making effective the gear changes selected by the selector control of a power device for operating the said executive control together with means for controlling said power device operable in conjunction with the manual selector control.

(e) The provision of a power device as above referred to constructed as a self-contained unit having the minimum number of external connections and adapted for mounting on any type of motor vehicle without modification of its internal structure.

These and other objects as will hereinafter appear are obtained by the apparatus of the present invention as hereinafter described.

The invention consists in all the features herein set forth, either severally or together or any combination thereof including all modifications thereof such as will be evident to those skilled in the art.

In what follows two embodiments of the invention together with certain modifications are particularly described with reference to the accompanying drawings. This description is given by way of example only and is not to be considered as restricting the scope of the invention as defined in the appended claims.

In the drawings;

Fig. 4 is a transverse vertical section taken along the line 4—4 of Fig. 3.

Fig. 5 is a transverse vertical section taken along the line 5—5 of Fig. 3.

Fig. 6 is a transverse vertical section taken along the line 6—6 of Fig. 3.

Fig. 7 is a longitudinal vertical section of the upper part of the top casing of the variable gear housing shown in Fig. 1.

Fig. 8 is a transverse vertical section taken along the line 8—8 of Fig. 7.

Fig. 9 is a view in side elevation of a second embodiment similar to Fig. 1 but including an epicyclic variable speed gear.

Fig. 10 is a detail view from above of the manual selector control shown in Fig. 9.

Fig. 11 is a detail view on an enlarged scale showing a modification of the showing of Fig. 9 relating to the manual selector and power device control.

Fig. 12 shows in end elevation, partly in section, certain of the parts of the variable speed gear contained in the gear casing of Fig. 9.

Fig. 13 is a side elevation of the parts shown in Fig. 12 partly in section.

Figure 1:
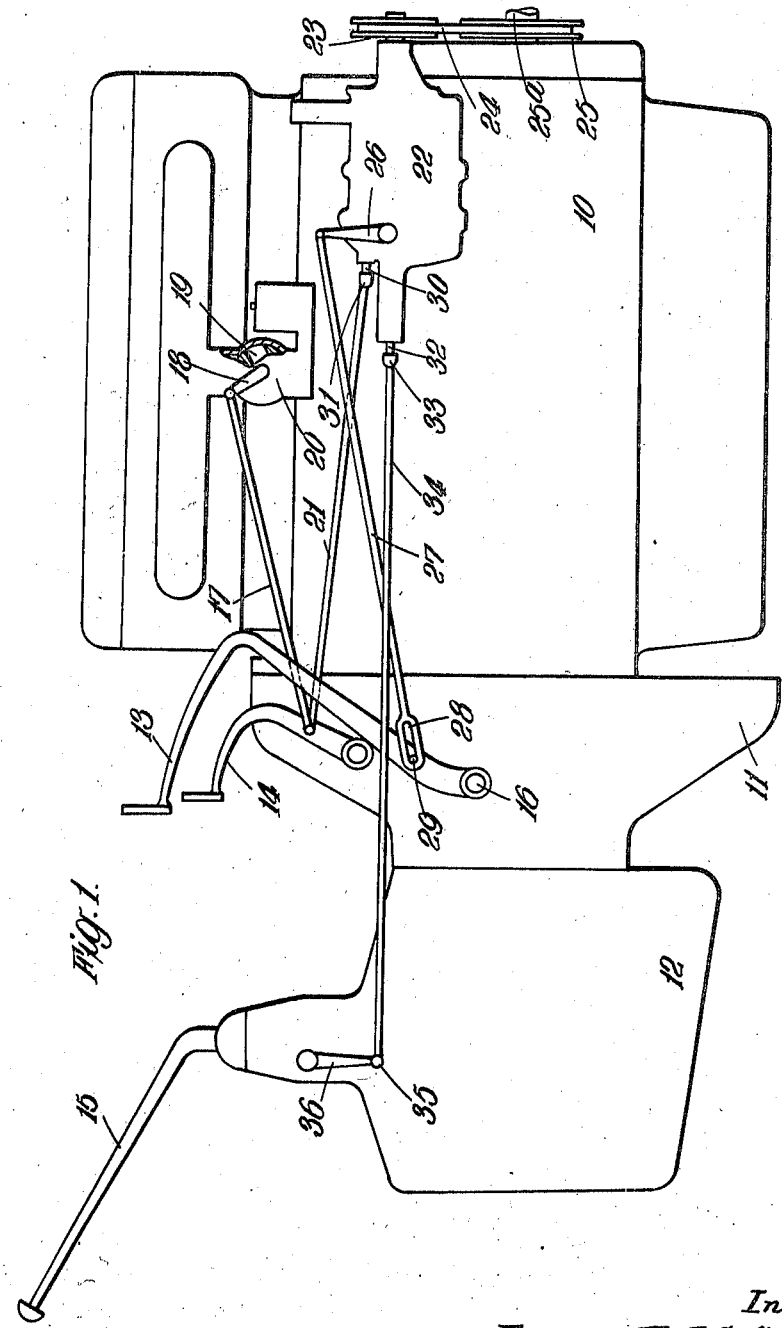
Fig. 1 represents in side elevation a combined motor, clutch and variable speed gear unit for a motor vehicle, including an auxiliary power device together with the various controls.

Referring to Fig. 1, this represents a combined motor, clutch and variable speed gear unit for a motor vehicle, and consists of three main parts, the motor 10, the clutch casing 11 and the variable speed gear casing 12 and carries the following controls; a clutch pedal 13 mounted on a rocking shaft 16, an accelerator pedal 14 and a gear shift lever 15. The accelerator pedal 14 is connected by means of a rod 17 with a throttle lever 18 which operates the throttle valve 19 mounted in the carburettor shown generally at 20.

The auxiliary power unit for operating the clutch, shown at 22, is secured in any suitable manner to the motor 10 and is provided with a suitable driving connection from the motor 10; in the example illustrated this comprises a driving pulley 23 which is connected by a belt 24 with a pulley 25 mounted on a motor driven shaft 25a which may be the motor crankshaft itself or an auxiliary drive shaft. The auxiliary power unit 22 is also provided with an external lever 26 to which is pivoted a rod 27 having a slot 28 engaging a pin 29 mounted on the clutch pedal 13. The other external connections of the unit 22 comprise a valve stem 30 pivoted at 31, a rod 21 connected to the accelerator pedal 14 and a stem 32 pivoted at 33 to a rod 34 whose rear end is pivoted at 35 to a lever 36 carried by the upper part of the gear casing 12.

Figure 2:
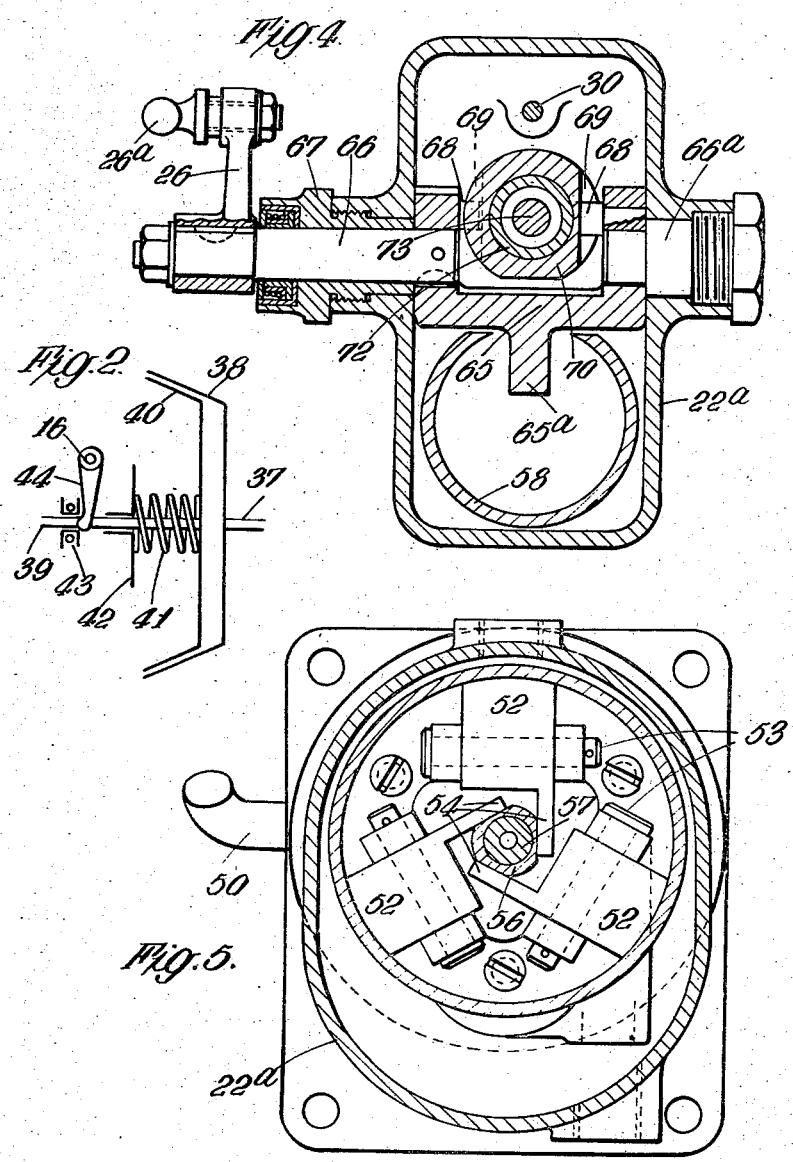
Fig. 2 represents in diagrammatic form the elements composing the clutch.

Fig. 2 shows diagrammatically the elements of the clutch contained in the casing 11. These elements comprise a driving shaft 37 driven by the motor and carrying a driving member 38, a driven member 40 mounted on a driven shaft 39, engaging spring 41 having a fixed abutment 42, withdrawal race 43 mounted on the driven shaft 39 and striking fork 44 mounted on the shaft 16 shown in Fig. 1.

The construction of the power unit 22 is shown in Figs. 3, 4, 5 and 6. It comprises a hollow casing 22a secured to a central part 22b together with end members 22c and 22d. The part 22a constitutes an oil reservoir and includes a closed pump chamber 48 containing a gear type pump comprising a driven gear 47 and a driving gear 46 which is keyed to a shaft 45 journalled in the end member 22c and carrying the driving pulley 23. The pump chamber 48 is provided with a suction pipe 48a communicating with the interior of the casing 22a and a delivery orifice 49 communicating with a delivery pipe 50 arranged outside the casing. The inner end of the shaft 45 is supported in the wall of the pump chamber 48 and terminates in a bell shaped housing 51 carrying centrifugal weights 52 on pivots 53. The weights 52 have projections 54 engaging shoulders 55 formed on a sleeve 56 which is slidably mounted on a spigot 57 secured concentrically in the end of shaft 45.

The part 22b is machined from a solid piece and comprises a cylinder 58 in which is slidable a piston 59 and a valve chest 60 in which is formed a bore 61 open at both ends and concentric with the shaft 45. Surrounding the bore 61 is an annular recess 62 having an orifice 63 communicating with the external delivery pipe 50 and a port 64 communicating with cylinder 58. The piston 59 engages the end of a lever 65a formed on a yoke member 65 having one arm keyed on a cross shaft 66, which is journalled in a bearing 67 secured in the side of the end member 22d, the other arm of the yoke 65 being supported on a spigot 66a secured in the other side of the member 22d (see Fig. 4). The shaft 66 carries the lever 26 on the end of which is mounted a ball 26a forming the joint with the rod 27 shown in Fig. 1. The arms of the yoke 65 carry pins 68 eccentric with respect to shaft 66 and engaging in vertical slots 69 formed in a sleeve member 70 which is slidably mounted in the bore 61 of the valve chest 60 and provided with ports 71 registering with the annular recess 62.

Slidably mounted within the sleeve 70 is a valve member 72 adapted to close and uncover the ports 71. Concentrically within the member 72 is slidably mounted a rod 73 round which is arranged a helical compression spring 74 housed in a recess of the sleeve member 72 and abutting against shoulders 72a, 73a respectively formed on the members 72, 73. Between the inner end of the rod 73 and the end of the sleeve member 56 is arranged a thrust bearing comprising a single central ball 75 and a thrust washer 76 seated in the end of sleeve 56. The thrust of the bearing 75, 76 on the rod 73 is opposed by helical compression springs 77, 78 enclosed in a screwed sleeve 79 and seating respectively on abutment nuts 80, 81. These nuts are arranged concentrically one within the other and are independently adjustable, the abutment nut 80 of the inner or primary spring 77 being screwed within the abutment nut 81 of the outer or secondary spring 78 and the latter nut 81 being screwed into the sleeve 79. Lock nuts 82, 83 are provided for the nuts 80 and 81 respectively. The primary spring 77 abuts directly on the end of rod 73 while the secondary spring 78 acts through a loose distance piece 84 on the end of a threaded collar 85 screwed on the end of the rod 73. The secondary spring 78 is arranged not to come into operation until the primary spring 77 has been compressed to a certain extent. This is achieved by providing the screwed sleeve 79 with an internal shoulder 79a to engage the distance piece 84. When the spring 77 is fully extended there is a clearance between the end of the collar 85 and the distance piece 84 and until the spring 77 has been compressed sufficiently for this clearance to be taken up the spring 78 is inoperative; whereas further movement (to the left in Fig. 3) of the rod 73 compresses both springs.

The sleeve 79 is screwed into a socket 87 secured in the member 22d, a lock nut 87a being provided for locking the sleeve 79. Adjustment of the clearance between the distance piece 84 and the collar 85 may be obtained by screwing the sleeve 79 into or out of the socket 87.

The end of the rod 73 is counter-bored at 86 to receive the end of the stem 32 shown in Fig. 1. The stem 32 engages a cross pin 88 the ends of which are secured to the sleeve member 72, the rod 73 being slotted at 89 to accommodate the pin 88 and allow it to move longitudinally with respect to the rod.

The valve chest part 60 is also bored parallel to the bore 61 to receive an open ended sleeve 90 having ports 91 registering with the annular recess 62 and a valve piston 92 is slidable within the sleeve 90 and is secured to the stem 30, shown in Fig. 1, which enters the end member 22d through a gland 93.

A breather 94 is provided for equalizing the pressure inside the casing 22a with the atmosphere.

The operation of the unit is as follows:—

The pump 46, 47 continuously draws oil from the reservoir 22a and delivers it to the annular recess 62. If either of the ports 71, 91 is open the oil escapes through them and is returned to the sump through the open end of the bore 61 or of the sleeve 90. If, however, both the ports 71, 91 are closed the oil cannot escape from the annular recess 62 and is therefore delivered into the cylinder 58, thus forcing out the piston and rocking the yoke member 65, shaft 66 and lever 26 in a clockwise direction. With the lever 26 coupled as shown in Fig. 1 to the clutch pedal the clockwise movement of the lever 26 acts to disengage the clutch.

It will be noted that the pin and slot connection 28, 29 in Fig. 1 serves to allow the clutch to be disengaged in the ordinary way by the foot without disturbing the power unit 32.

The members 70, 73 constitute a compound valve whose operation depends on the positions of both the piston 59 and the spring loaded centrifugal control 52—56, 73, 77, 78. Normally the weights 52, sleeve 56, rod 73 and valve member 72 move as a unit, the member 72 being held against the collar 85 by the spring 74 and the spring 77 holding the rod 73 against the thrust bearing 75, 76 and the sleeve 56 against the projections 54 of the weights 52. The movement of this assembly is limited by the abutment of the weights in one direction on the sleeve 56 and in the other on the walls of the housing 51. The position of the assembly 56, 73, 72 depends on the speed of shaft 45 over a certain range of speed, the lower limit being the speed at which the centrifugal weights first overcome the initial tension of spring 77 and the upper limit that at which the centrifugal weights strike the walls of the housing 51.

Figure 3:
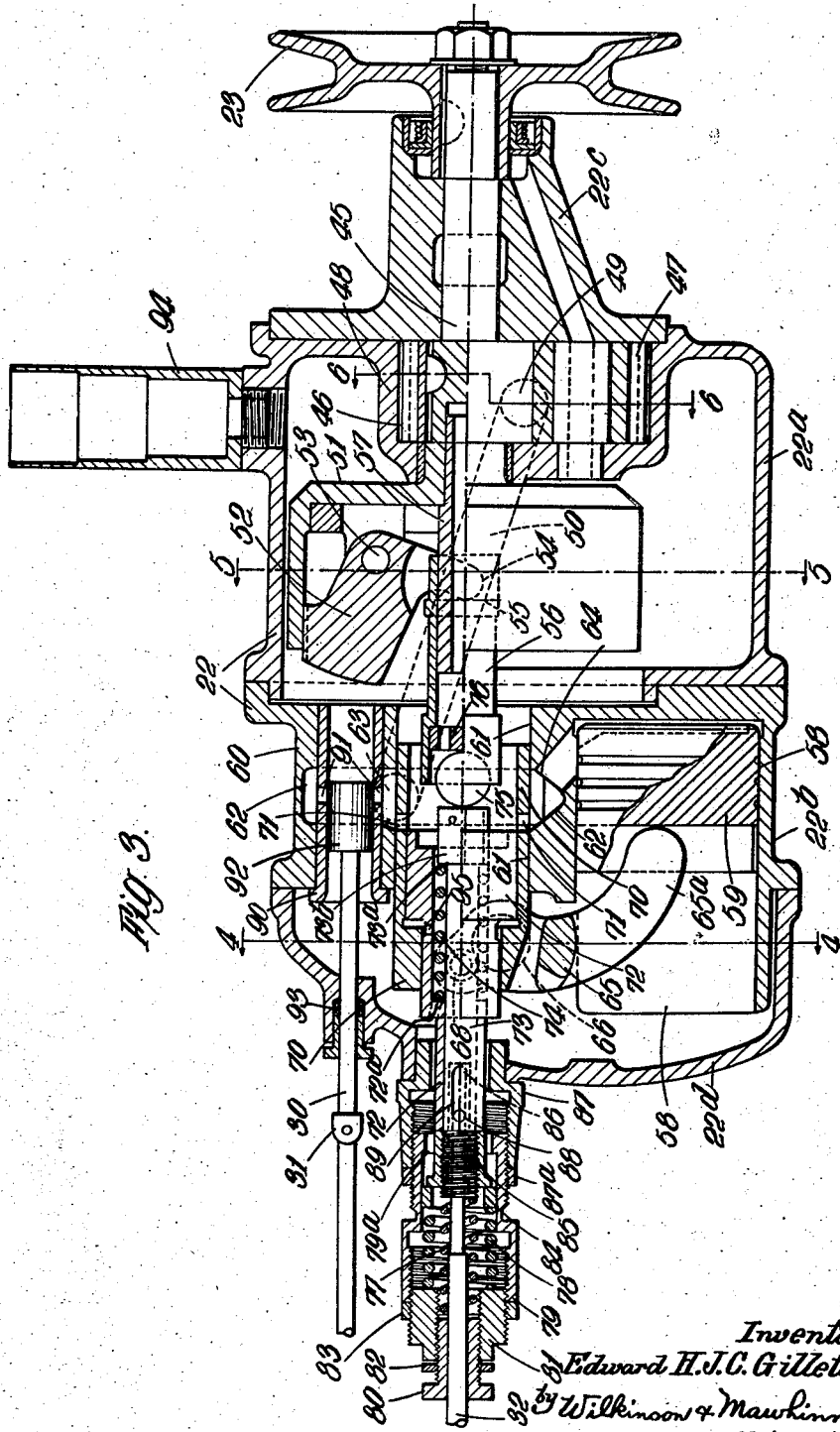
Fig. 3 is a longitudinal vertical section of the auxiliary power device.

As the speed decreases from the upper to the lower limit the valve member 72 moves from the position shown in Fig. 3 to the right. The first effect of this is to close ports 71 and block the free outlet from the annular recess 62 so that the oil is delivered to the cylinder 58 and drives the piston 59 outwards. The movement of the piston is transmitted by yoke 65 and pins 68 to the sleeve 70 which follows up the valve member 72 till the ports 71 just begin to be opened when the delivery to the cylinder is relieved and the piston is stopped. Further decrease of speed results in further movement of the member 72 closing the ports 71, until a further movement of the piston and sleeve 70 opens the ports 71 again. The movement of the piston is thus progressive over the operative speed range of the centrifugal control as for any given speed within this range there is a definite position of the piston 39 and hence of the clutch pedal. This arrangement enables the clutch to be slipped indefinitely by maintaining the speed of the motor and hence of shaft 45 at a value lying within the operative speed range of the centrifugal control, thus holding the clutch-operating piston 59 in a position intermediate the limits of its stroke corresponding to partial engagement of the clutch.

In order however to prevent continued slipping of the clutch under heavy loads the throttle controlled valve 90, 91, 92 is provided. In this the valve piston 92 covers the ports 91 at small throttle openings but when the throttle opening exceeds a given value, preferably about one-third open, the stem 30 is moved sufficiently inwards to cause the piston 92 to clear the ports 91, thus giving free escape of the oil from the recess 62 and allowing the piston 59 to return to the bottom of the cylinder 58 and permitting the clutch to engage fully independently of the position of the centrifugally controlled valve member 72.

For disengaging the clutch at speeds above the operating range of the centrifugal control the stem 32 is moved inwards carrying with it pin 88 and valve member 72 and compressing spring 74, the movement of the member 72 being followed up by the piston 59 and sleeve 70 as already described. The slot 89 in rod 73 is made long enough to allow the full travel of valve member 72 so that the clutch may be fully disengaged.

In order to cushion the final engagement of the clutch, it is desirable to make the degree of movement of the valve member 72 smaller in relation to the degree of increase of motor speed at the end of the valve travel in the clutch engaging direction than at the beginning. This is accomplished by the use of the secondary spring 78 stronger than the primary spring 77 and maintained inoperative by means of a stop and clearance as already described over the first part of the travel of valve member 72 in the clutch engaging direction.

By providing separate adjustments 80, 81 for each spring 77, 78 and a clearance adjustment 79, 87 as already described, both upper and lower limits of the operative speed range of the centrifugal control and the degree of cushioning at the clutch engaging end of the stroke may be suitably regulated.

It may be noted that the back of the valve member 72 is in free communication with the open space of bore 61 by means of clearances provided by forming grooves or flats on the head 73b of the rod 73 and a vent 95. This ensures that the valve member 92 is pressure balanced and can therefore not disturb the correct functioning of the centrifugal control.

In the embodiment of Fig. 1, clutch disengagement is automatically effected during changes of gear as follows:—

Referring to Figs. 1, 7 and 8, at the top of the variable speed gear casing 12 is mounted a gear change lever 15 of the ordinary kind whose lower end is adapted for operating the gear selecting mechanism. The lever 15 is fulcrumed at 106 in a support 107 which is rotatable transversely and slidable longitudinally in a housing 108 forming an upward extension of the variable gear casing 12.

In the support 107 is formed a circumferential V-shaped groove 109 which engages the upper end of a vertically slidable pin 110 whose lower end engages a pawl 111 mounted on a cross shaft 104 which carries externally a lever 36 coupled to the rod 34. The shaft 104 also carries a pawl 112 which engages a curved tooth 114 mounted on the lower part of the lever 15. The pawl 112 is provided with a projection 113 against one side or other on which the curved tooth 114 normally lies.

The operation of this device is as follows:—

When the lever 15 is moved to effect a change of gear the first effect of this movement is to slide the support 107 longitudinally in the direction of said movement, the lever being prevented from rocking appreciably on its fulcrum 106 by the engagement of the tooth 114 with the flank of the projection 113. The movement of the support 107 by displacing the groove 109 forces the pin 110 downwards against the pawl 111 thereby rocking the shaft 104 and with it the external lever 36 in a counter-clockwise direction.

The rod 34 is thereby moved to the right, thus moving the stem 32 inwards (see Fig. 3) and operating the valve member 72 to disengage the clutch as already described.

The rocking of the shaft 104 raises the pawl 112 so that the tooth 114 can clear the projection 113. Continued movement of the lever 15 now rocks it about its fulcrum 106 to effect the required change of gear. When this movement has been completed and the new gear engaged the lever is released whereupon the support 107 is centralized by the means illustrated in Fig. 8 consisting of a plunger 115 loaded by a spring 116.

The end of the plunger 115 is of conical form and engages the groove 109 so that it acts to urge the support 107 to a central position. The centralizing of the support 107 allows the pin 110 to rise into its normal position in which its upper point rests in the bottom of the groove 109. The raising of the pin 110 allows the elements 104, 36, 111, 112 to rock back into their normal position, the tooth 114 being again engaged with the projection 113.

It will be noted that the return of elements 104, 111, 36 is effected by the pressure of spring 74 (Fig. 3) acting through the elements 72, 88, 32, 34.

The curvature of the tooth 114 is struck in an arc from the centre of the support 107 so that its engagement with the pawl 112 is not effected by sideways rocking of the gear shift lever 15. Further the projection 113 is shaped so that the tooth 114 can engage with either flank thereof according as the gear shift lever 15 is in a forward or rearward position corresponding to the particular gear selected.

By this means it will be seen that the gear shift lever 15 is not operative to shift the gears until by movement of the support 107, it has operated to disengage the clutch; further the clutch cannot be re-engaged until a gear engagement has been effected since rocking of the pawl 112 in the clutch engaging direction is blocked by the engagement of the tip of projection 113 with the tooth 114 except when the lever 15 is in one or other gear engaging position.

Fig. 9 shows a modified embodiment including a variable speed gear of epicyclic type having a selector control operated by a lever on the steering column of the vehicle and an executive control for making the selected changes of gear effective, the executive control being operated by the power unit 22. The variable speed gear comprises a number of epicyclic trains which are brought into action by friction bands which are releasable by depressing a pedal. The selector control actuates a system of cams whereby on releasing the pedal one or other of the bands is engaged as determined by the selector control.

In the example shown the pedal operating the executive control also operates a transmission clutch, but this feature may be dispensed with since the friction bands may themselves perform the function of the clutch.

Referring to Figs. 9 and 10, the showing is in general similar to Fig. 1 in particular the auxiliary power unit 22 is identical with that of Fig. 1, and its connections with the motor, clutch and accelerator are exactly the same as in Fig. 1 and need not therefore be further described.

In Fig. 9 however the variable speed gear casing being of a different form from that in Fig. 1 is indicated by the numeral 12a. There is also shown in Fig. 9 the steering column 95 of the vehicle to which is secured a quadrant 96. A hand lever 97 is pivoted at 98 to a rotatable rod 100 and is engageable with notches 96a of the quadrant 96 (see Fig. 10).

To move the lever from one notch to another it must be rocked upwards about its pivot 98 against the action of a spring 99 which serves to hold the lever in engagement within a selected notch 96a. It will be noted that two notches only are shown in Fig. 10 for clearness, but the quadrant 96 will actually possess as many notches as there are gear ratios, including reverse and also a notch for neutral.

Movement of the lever 97 from one notch to another rotates the rod 100 which carries at its lower end a gear 100a meshing with a second gear 101a carrying a lever 101 to which is connected a rod 102 actuating a lever 103 which actuates the selector mechanism inside the gear casing 12a. The lever 97 is further connected at 116 to a rod 117 which actuates the rod 34 through a bell crank lever 118 pivoted at 118a. Further the rod 119 connects the clutch pedal 13 with a lever 120 which actuates the friction bands for applying the various trains of epicyclic gears within the casing 12a.

It will be seen that when the lever 97 is raised against the spring 99 to clear the notches 96a the train of elements 117, 118, 34 is actuated to move the stem 32 of the power unit 22 inwards, so as to operate the valve mechanism of the power unit 22 in the manner already described to rock the lever 26 clockwise and thereby depress the pedal 13. Depression of the pedal 13 actuates the rod 119 to rotate the lever 120 in a counterclockwise direction, the effect of this being to release the friction bands of the variable speed gear 12a to disengage the transmission.

When the lever 97 is brought over the selected notch 96a the lever 103 actuated by the train of elements 100, 100a, 101a, 101, 102 has selected the required brake band in the gear casing 12a for application to engage the selected gear ratio and on releasing the lever 97 it is pressed downwards into the selected notch 96a by the spring 99 and thereby the train of elements 117, 118, 34 is moved to withdraw the stem 32, whereupon the valve mechanism of the unit 22 operates to return the lever 26 to its normal position and permit the lever 120 to rotate in a clockwise direction to apply the selected friction band and engage the selected gear.

It will be seen that the transmission may be disconnected by freeing all the friction bands without effecting a change of gear by lifting the lever 97 out of the notch 96a in which it is located. It will also be seen that during the passage of the lever 97 from one of the units 96a to another of said notches the lever is supported on the ridge of the quadrant between the notches, whereby the stem 32 is held in the inward position and the transmission maintained disengaged until the lever 97 is lowered into one or other of the notches 96a.

In Fig. 11 a movement of the above described arrangement is shown in which the rod 117 is not actuated by movement of the lever 97 itself but by an auxiliary lever 121 pivoted to the lever 97 and connected to rod 117 by a rod 121a and bell crank 121b pivoted at 121c. By raising the lever 121 against the action of a spring 122 the train of elements 117, 118, 34 is operated to move the stem 32 inwards so as to disengage the transmission and on releasing the lever 121 the stem 32 is moved outwards and the selected friction band of the variable gear 12a is engaged. In this modification the lever 97 is not pivoted for up and down movement to rod 100 and notches of quadrant 96 may be quite shallow the resilience of the lever 97 itself being sufficient to hold it in the selected notch.

Figs. 12 to 15 show by way of example a suitable mechanism for the epicyclic variable speed gear.

Figure 15:
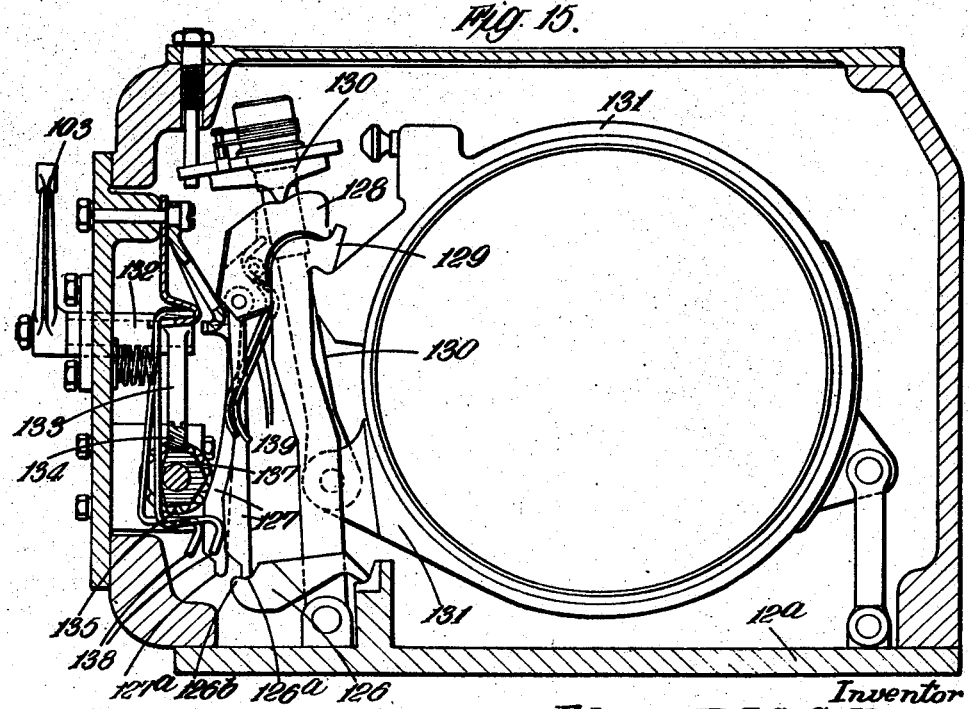
Fig. 15 shows in end elevation, partly in section, the parts shown in Fig. 14 together with certain other parts of the variable speed gear of Fig. 9.

The lever 120 actuates a cross shaft 123 carrying an internal lever 124 connected by means of a push link 125 with a rockable bus bar 126, which is adapted to engage one or other of a number of link members 127 actuating toggles 128 engaging fulcrum members 129 and links 130 for actuating brake bands 131 (see Fig. 15).

The brake bands 131 cooperate with the annulus members of a number of epicyclic trains not shown. The bus bar 126 is acted on by a spring 131a in a direction to press the link members 127 upwards and apply the friction bands 131. When the lever 120 is rocked in a counterclockwise direction the bus bar 126 is rocked in a counterclockwise direction (see Fig. 12) against the spring 131a and the link members 127 are released, thus freeing the brake bands 131.

Figure 14:
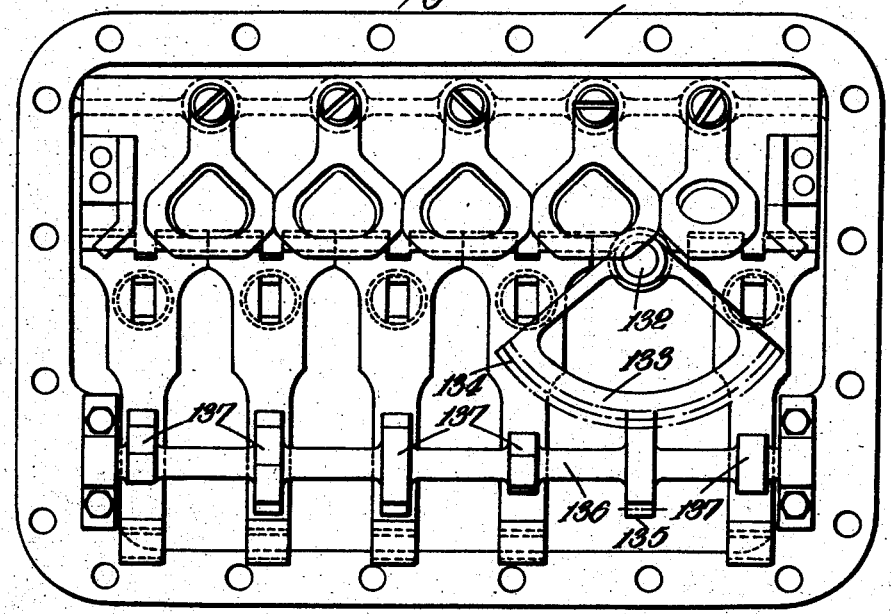
Fig. 14 shows in side elevation from within the gear casing of Fig. 9 the parts of the variable speed gear carried by the side cover plate.

Referring to Figs. 14 and 15 the lever 103 is mounted on a shaft 132 carrying quadrant 133 having a skew gear 134 engaging a skew gear wheel 135 mounted on a shaft 136 carrying a number of cams 137 engaging spring members 138 which in turn engage the links 127. The links 127 are also engaged by spring members 139. The springs 138 act to urge the links 127 into position for engagement with the bus bar 126 and the spring members 139 act to press the links 127 out of engagement with the bus bar but are of less strength than the springs 138.

The cams 137 are so arranged that only one of the springs 138 is operative at a time whereby only one of the links 127 is urged to engaging position with the bus bar, the remaining links being withdrawn from the bus bar by the action of springs 139.

As long as the bus bar is in engagement with one of the links 127 that link cannot be withdrawn from engaging position since the bus bar 126 is provided with notches 126a which effectively hold the engaged link 127 in position.

On moving the lever 103 to select a change of gear the spring member 138 acting on the link 127 for the time being engaged with the bus bar 126 is withdrawn by its cam and the cam appropriate to the new selected gear is brought into position to bring into action its associated spring 138, but its associated link 127 cannot be brought into position to engage the bus bar 126 until the latter is withdrawn on account of the blocking action between the toe 127a of the link 127 and the nose 126b of the bus bar 126. On withdrawing the bus bar by operating the lever 120 the link 127 up to that instant in engagement is sprung back by its spring 139 and the link 127 of the newly selected gear is sprung into position by its spring 138 to engage the bus bar, so that on rotation of the lever 120 to re-engage the bus bar 126 the link 127 appropriate to the newly selected gear is engaged and the friction band 131 actuated thereby is applied.

It will be seen that with the arrangement shown in Figs. 9 and 10 the selector control and the power actuated executive control operating by means of the lever 120 of the variable speed gear, are actuated together, i. e. the selection of the required gear ratio and the bringing into effective operation of that gear ratio are effected simultaneously; whereas with the arrangement shown in the modification of Fig. 1 the selector control may be operated preselectively, i. e. a new gear ratio may first be selected by moving the manual selector lever and the selected gear change subsequently made effective by operating on the auxiliary lever 121.

Referring once again to the power device illustrated in Fig. 3 it will be seen that this constitutes a self-contained unit carrying its own supply of oil for working purposes and for lubrication.

It will further be seen that all the internal moving parts of said power device are self-lubricating and that the external connections of said unit are reduced to the minimum requisite for performing its proper functions.

What I claim is:—

1. In an automobile, a motor, a transmission clutch, a power-actuated clutch-operating member, a control device responsive to the speed of the motor, means regulating the application of power to said clutch-operating member depending on the positions of both clutch-operating member and said control device to produce graduated engagement of the clutch as the motor speed is increased through a selected speed range and means controllable by the driver for regulating the application of power to said clutch-operating member independently of said first named regulating means.

2. In an automobile, a motor, a variable speed gear, gear shifting means, a transmission clutch, a power-actuated clutch-operating member, a control device responsive to the speed of the motor, means regulating the application of power to said clutch-operating member depending on the positions of both said clutch-operating member and said control device to produce graduated engagement of the clutch as the motor speed is increased through a selected speed range and means connected with the gear shifting means for regulating the application of power to said clutch-operating member independently of said first named regulating means to disengage the clutch during gear-shifting.

3. In an automobile, a motor, a transmission clutch, a power-actuated clutch operating member, a control device responsive to the speed of the motor, means regulating the application of power to said operating member depending on the positions of both said operating member and said control device to produce graduated engagement of the clutch as the motor speed is increased through a selected speed range, a throttle for the motor and throttle-connected means regulating the application of power to said operating member to ensure engagement of said clutch when the throttle exceeds a selected opening independently of the position of said motor-speed-responsive control device.

4. In an automobile, a motor, a transmission clutch, a cylinder, a movable member therein operative on said clutch, a source of fluid pressure with a connection to said cylinder, a control device responsive to the speed of the motor and valve means for controlling the pressure in said cylinder depending on the positions of both said clutch-operating member and said control device to produce graduated engagement of the clutch as the motor speed is increased through a selected speed range, together with a motor throttle and throttle-connected valve means controlling the pressure in said cylinder to ensure engagement of the clutch when the throttle exceeds a selected opening independently of the position of said control device.

5. In an automobile having a motor and a transmission clutch, a liquid containing reservoir, a motor connected pump supplied from said reservoir, a cylinder, a pressure-actuated member movable therein and having a connection with said transmission clutch, a delivery connection from said pump to said cylinder, motor connected elements displaceable responsively to motor speed and valve means connecting said cylinder with said reservoir depending on the positions of both said pressure-actuated member and said speed responsive elements to produce graduated engagement of the transmission clutch as the motor speed increases through a selected speed range, a motor throttle and throttle-connected valve means for controlling the delivery to said cylinder so as to ensure engagement of the transmission clutch when the throttle exceeds a selected opening.

6. In an automobile having a motor and a transmission clutch, a liquid containing reservoir, a motor connected pump supplied from said reservoir, a cylinder, a pressure-actuated member movable therein and having a connection with said transmission clutch, a delivery connection from said pump to said cylinder, motor connected elements displaceable responsively to motor speed and valve means connecting said cylinder with said reservoir depending on the positions of both said pressure-actuated member and said speed responsive elements to produce graduated engagement of the transmission clutch by progressive exhaustion of the cylinder as the motor speed increases through a selected speed range, a motor throttle and throttle-connected valve means for exhausting the cylinder entirely and ensuring the engagement of the transmission clutch when the throttle exceeds a selected opening.

7. In an automobile having a motor, a transmission clutch and a control member therefor, a liquid containing reservoir, a motor connected pump supplied from said reservoir, a cylinder, a pressure actuated member movable therein and having a connection with said control member, a delivery connection from said pump to said cylinder, motor connected elements displaceable responsively to motor speed and valve means connecting said cylinder with said reservoir depending on the positions of both said pressure-actuated member and said speed responsive elements to produce graduated operation of the control member over a selected range of motor speeds.

8. In an automobile having a motor, a transmission clutch and a control member therefor, a liquid containing reservoir, a motor connected pump supplied from said reservoir, a cylinder, a pressure-actuated member movable therein and having a connection with said control member, a delivery connection from said pump to said cylinder, motor connected elements displaceable responsively to motor speed and valve means connecting said cylinder with said reservoir depending on the positions of both said pressure-actuated member and said speed responsive elements to produce graduated operation of the control member over a selected range of motor speeds, together with independently controllable valve-actuating means overriding said speed responsive elements for operating the control member at will at motor speeds exceeding said selected speed range.

9. In an automobile having a motor, a transmission clutch and a control member therefor, a liquid containing reservoir, a motor connected pump supplied from said reservoir, a cylinder, a pressure-actuated member movable therein and having a connection with said control member, a delivery connection from said pump to said cylinder, a motor connected device including centrifugal elements and restraining spring means and valve means connecting said cylinder with said reservoir depending on the positions of both said pressure-actuated member and said centrifugal elements to produce graduated operation of the control member over a selected range of motor speeds.

10. In an automobile having a motor, a transmission clutch and a control member therefor, a liquid containing reservoir, a motor connected pump supplied from said reservoir, a cylinder, a pressure-actuated member movable therein and having a connection with said control member, a delivery connection from said pump to said cylinder, a motor connected device including centrifugal elements and restraining spring means comprising a primary spring which resists the centrifugal force at all speeds, a secondary spring arranged with a clearance so as to introduce additional resistance at high speeds only and independent adjusting means for each spring and valve means connecting said cylinder with said reservoir depending on the positions of both said pressure-actuated member and said centrifugal elements to produce graduated operation of the control member over a selected range of motor speeds.

11. In an automobile having a motor, a transmission clutch and a control member therefor, a liquid containing reservoir, a motor connected pump supplied from said reservoir, a cylinder, a pressure-actuated member movable therein and having a connection with said control member, a delivery connection from said pump to said cylinder, a motor connected device including centrifugal elements and restraining spring means comprising a primary spring which resists the centrifugal force at all speeds, a secondary spring arranged with a clearance so as to introduce additional resistance at high speeds only, means for adjusting said clearance and means for adjusting the initial tension of each spring independently and valve means connecting said cylinder with said reservoir depending on the positions of both said pressure-actuated member and said centrifugal elements to produce graduated operation of the control member over a selected range of motor speeds.

12. In an automobile having a motor, a transmission clutch and a control member therefor, a casing adapted to contain a liquid and arranged within said casing, a rotary shaft having an external connection to the motor, a pump chamber having a suction orifice communicating with the interior of the casing, a pump element within said chamber mounted on said shaft, a valve chest having an open bore coaxial with said shaft and having an internal annular recess, a delivery channel connecting the pump chamber with said annular recess, a cylinder having a port opening into said annular recess, a piston in said cylinder, a lever actuated by said piston and having an external arm for connection to the control member, a valve sleeve slidable by said lever in the bore of the valve chest and having ports registering with said annular recess, a housing mounted on said shaft, a plurality of centrifugal elements arranged in said housing, a valve member slidable concentrically in said valve sleeve and adapted to close the ports of said valve sleeve and an actuating connection between said valve member and said centrifugal elements.

13. In an automobile having a motor, a transmission clutch and a control member therefor, a casing adapted to contain a liquid and arranged within said casing, a rotary shaft having an external connection to the motor, a pump chamber having a suction orifice communicating with the interior of the casing, a pump element within said chamber mounted on said shaft, a valve chest having an open bore coaxial with said shaft and having an internal annular recess, a delivery channel connecting the pump chamber with said annular recess, a cylinder having a port opening into said annular recess, a piston in said cylinder, a lever actuated by said piston and having an external arm for connection to the control member, a valve sleeve slidable by said lever in the bore of the valve chest and having ports registering with said annular recess, a housing mounted on said shaft, a plurality of centrifugal elements arranged in said housing, a valve member slidable concentrically in said valve sleeve and adapted to close the ports of said valve sleeve and an actuating connection between said valve member and said centrifugal elements, said actuating connection including a sleeve slidable on said shaft and a thrust bearing between said last named sleeve and said valve member.

14. In an automobile having a motor, a transmission clutch and a control member therefor, a casing adapted to contain a liquid and arranged within said casing, a rotary shaft having an external connection to the motor, a pump chamber having a suction orifice communicating with the interior of the casing, a pump element within said chamber mounted on said shaft, a valve chest having an open bore coaxial with said shaft and having an internal annular recess, a delivery channel connecting the pump chamber with said annular recess, a cylinder having a port opening into said annular recess, a piston in said cylinder, a lever actuated by said piston and having an external arm for connection to the control member, a valve sleeve slidable by said lever in the bore of the valve chest and having ports registering with said annular recess, a housing mounted on said shaft, a plurality of centrifugal elements arranged in said housing, a valve member slidable concentrically in said valve sleeve and adapted to close the ports of said valve sleeve and an actuating connection between said valve member and said centrifugal elements, said actuating connection including a sleeve slidable on said shaft, a thrust bearing, a valve stem slidable concentrically within said valve member, and a buffer spring; together with loading spring means acting on said valve stem in opposition to the thrust of the centrifugal elements.

15. In an automobile having a motor, a transmission clutch and a control member therefor, a casing adapted to contain a liquid and arranged within said casing, a rotary shaft having an external connection to the motor, a pump chamber having a suction orifice communicating with the interior of the casing, a pump element within said chamber mounted on said shaft, a valve chest having an open bore coaxial with said shaft and having an internal annular recess, a delivery channel connecting the pump chamber with said annular recess, a cylinder having a port opening into said annular recess, a piston in said cylinder, a lever actuated by said piston and having an external arm for connection to the control member, a valve sleeve slidable by said lever in the bore of the valve chest and having ports registering with said annular recess, a housing mounted on said shaft, a plurality of centrifugal elements arranged in said housing, a valve member slidable concentrically in said valve sleeve and adapted to close the ports of said valve sleeve and an actuating connection between said valve member and said centrifugal elements including buffer spring means; together with means having an external operating connection for moving the valve member relatively to the centrifugal elements, such movement being permitted by compression of the buffer spring means.

16. In an automobile having a motor, a transmission clutch and a control member therefor, a casing adapted to contain a liquid and arranged within said casing, a rotary shaft having an external connection to the motor, a pump chamber having a suction orifice communicating with the interior of the casing, a pump element within said chamber mounted on said shaft, a valve chest having an open bore coaxial with said shaft and having an internal annular recess, a delivery channel connecting the pump chamber with said annular recess, a cylinder having a port opening into said annular recess, a piston in said cylinder, a lever actuated by said piston and having an external arm for connection to the control member, a valve sleeve slidable by said lever in the bore of the valve chest and having ports registering with said annular recess, a housing mounted on said shaft, a plurality of centrifugal elements arranged in said housing, a valve member slidable concentrically in said valve sleeve and adapted to close the ports of said valve sleeve and an actuating connection between said valve member and said centrifugal elements; together with an independent relief valve communicating with said annular recess and having an external operating connection.

17. In an automotive vehicle an engine, a throttle controlling the engine output, a clutch and clutch-operating power means, the last named including a clutch-operating member; together with control means for said power means including in combination means responsive both to engine speed and to movement of said clutch-operating member and operative to produce graduated clutch operation over an extended range of engine speed and throttle-connected means operative to ensure complete clutch engagement when a selected throttle opening is exceeded.

18. In an automobile having a motor, a transmision clutch and a control member therefor, a fluid pressure system, a pressure pump, operating means for the pump, a pressure actuated member movably connected to the control member and to the system, means for connecting said pressure actuated member with the control member, motor connected means displaceable responsively to motor speed, and valve means connecting said pressure actuated member with the pressure system depending on the positions of both said pressure actuated member and said motor connected means to produce graduated operation of the control member over a selected range of motor speeds.

19. In an automobile having a motor, a transmission clutch and a control member, a fluid pressure means connected to the control member, operating means for the pressure means, and means actuated by the motor and by the control member and operable responsively to motor speed to produce graduated operation of the control member over a selected range of motor speeds.

EDWARD HENRY JAMES CECIL GILLETT.